Figure 1:
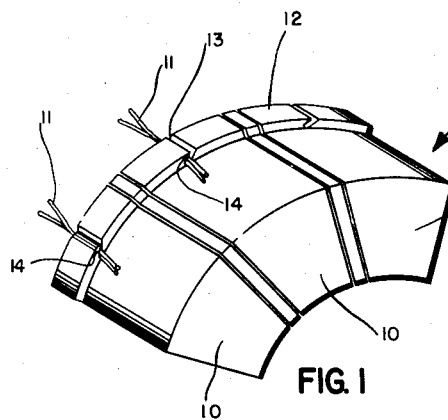

July 19, 1949.  R. AVIGDOR  2,476,795

FASTENING OF WIRES TO COMMUTATORS FOR ELECTRIC MOTORS

Filed Aug. 1, 1945

INVENTOR
Rifat Avigdor

By Featherstonhaugh & Co
Atty's

Patented July 19, 1949

2,476,795

UNITED STATES PATENT OFFICE 2,476,795

FASTENING OF WIRES TO COMMUTATORS FOR ELECTRIC MOTORS

Rifat Avigdor, Toronto, Ontario, Canada

Application August 1, 1945, Serial No. 608,264

4 Claims. (Cl. 171—321)

This invention relates to fastening of wires to commutators for electric motors.

Up to the present time it has been usual to fasten the wires to the commutators of electric motors by recessing the commutator segments at the points required, to form radially inwardly extending slots, and inserting the wires therein and soldering them. This practice, however, presents disadvantages in the operation or use of the equipment because the commutator parts become hot particularly when used over long periods, such as in airplanes, motor vehicles and the like, and the solder sometimes is melted. Thus under action of the centrifugal force created by the rotating commutator the wires are dislodged and the commutator becomes ineffective. To overcome this it has been proposed in some instances to use a hard solder having a higher melting temperature which necessarily would resist heats normally causing ordinary solder to melt, but hard solder is difficult to apply, particularly in the case of thin wires and the heat of application is so high that there is the tendency to damage the insulation of the wires.

These disadvantages are overcome by the present invention.

It is an object of the present invention to provide a simple means for fastening commutator wires which will avoid dislodgment of the wires under the effects of heat or as a result of normal operation of the commutator.

A further object of the invention is to provide a fastening means which is simpler to achieve than in the case of soldering and will at the same time provide a more practical fastening which can be maintained for a longer period of time.

A still further object of the invention is to provide a means of fastening armature wires to commutators which is more economical.

With these and other objects in view, the invention generally comprises the formation of channels in the peripheral surface of each segment of the commutator in such a way that adjacent parts of the commutator defining the channels may be disposed at an angle to form a mechanical lock clinching said wires in anchored contact with the commutator segments.

The invention will be fully understood by reference to the following detailed specification taken in conjunction with the accompanying drawings.

Figure 5:
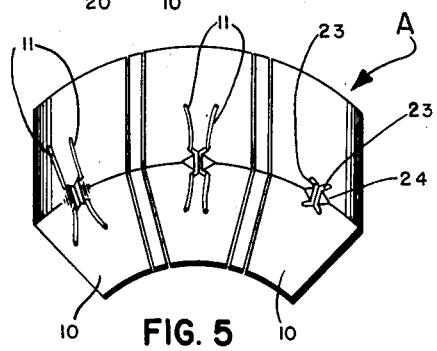
Figure 6:
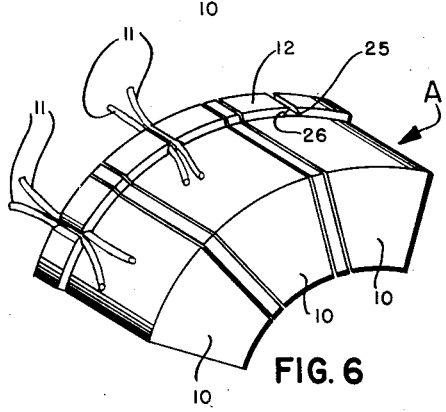
Figure 7:
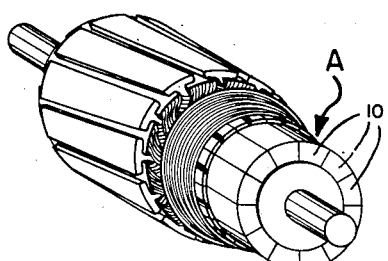

In the drawings:

Fig. 1 is a perspective illustration of a segment of a commutator showing one manner in which the wires are secured, and Figs. 2 to 6 illustrate similar views showing alternative manners of connecting the wires; while Fig. 7 is a perspective view of an armature to illustrate the general character of the unit in question.

Referring to the drawings, A indicates a portion of the commutator of an armature made up of a plurality of segments 10 and to which the wires 11 of the armature are designed to be connected. According to one form of connection, the commutator is formed with the raised circumferentially extending rib 12 which is formed with a notch or channel 13 in the case of each segment 10, the notch being disposed at an incline to the radial axis of the segment. The wires 11 are inserted in the channel and the tapered lip 14 formed on one side of the channel, by reason of its incline, is then forced downwardly into the channel, thus to secure the wires, as shown at the left hand side of Fig. 1.

Figure 2:
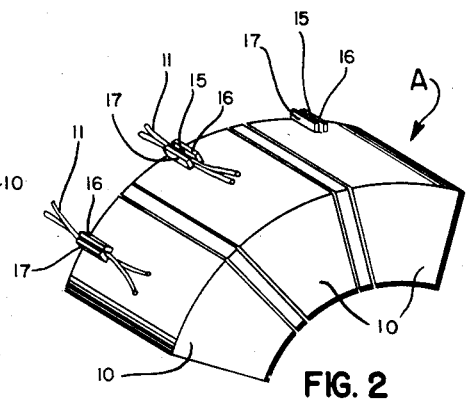
Figure 3:
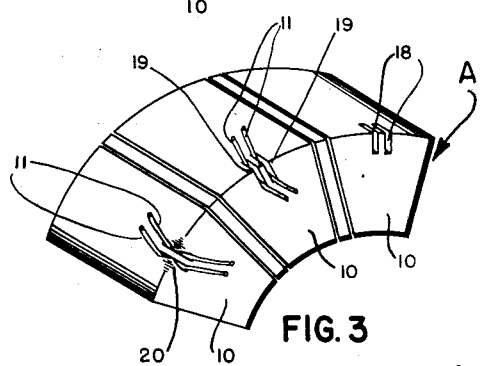

In the alternative construction shown in Fig. 2, the channel 15 is formed between two upstanding lugs 16 and 17 in spaced apart parallel relation to one another. These lugs may be formed by removing from the surface of the segments the intervening portions of a circumferential rib such as 12, illustrated in Fig. 1. The wires are introduced to channel 15 and the lugs are forcibly clinched together at an angle to the radial axis of the segment, as shown on the left hand side of Fig. 2, securely to anchor the wires in proper contacting relation with the segment. In the case of Fig. 3 a pair of channels 18 are formed in each segment 10 into which the wires 11 are projected, preferably in the angular relation shown. The outside marginal portions of each channel as indicated at 19, are then forcibly deformed to overlie the wires and clinch them as indicated on the left hand side of Fig. 3 at 20.

Figure 4:
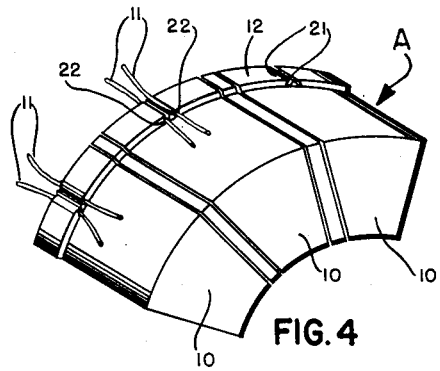

In the case of Fig. 4, the circumferential rib 12 is formed with a pair of channels 21 disposed in parallel slightly spaced apart relation, the channels being formed in opposed relation and inclined to the radial axis of the commutator. A wire 11 is inserted in each of these channels and the outside marginal portions 22 of each channel are forcibly deformed to clinch the wires within the channels as indicated on the left hand side of Fig. 4.

In Fig. 5 a substantially similar type of construction is provided as in the case of Fig. 4 with the exception that the channels 23 are formed across a corner edge of each segment 10 and the outer marginal portions of each channel are chamfered as at 24. These portions are then forcibly clinched over the wires 11 as clearly indicated at the left hand side of Fig. 5.

In the case of Fig. 6, the circumferential rib 12 is formed with a dovetailed channel 25 forming a tapered lip 26 on each side of the channel. The wires are inserted within this single channel as shown and then clinched by forcing the tapered lips firmly into contact with the wires as in the left hand side of Fig. 6.

It will be clear from the foregoing that I am able to firmly secure the armature wires to the commutator in a very simple manner without the use of solder which in many instances is melted and renders the armature defective. Moreover, not only does this obviate this cause of defect, but it simplifies armature production particularly in the case where a hard, higher melting solder is used as an alternative to overcome the defects referred to, as well as avoiding any possibility of burning of the wires as is sometimes the case in the latter type of practice.

The connection of the wires according to the present invention is a simple mechanical operation resulting in a firm anchoring of the wires which cannot be dislodged readily from their mounting regardless of the heat that may be developed and regular general usage.

What I claim as my invention is:

1. An armature having an annular commutator formed from a plurality of radially extending segments insulated from each other in which the outer peripheral surface of each of said segments is formed inwardly from each of its sides with a channel that inclines to the radial axis thereof to define a tapered lip and a solid shoulder thereunder, said tapered lip being depressible towards said shoulder to engage with a wire located in said channel.

2. An armature having an annular commutator formed from a plurality of radially extending segments insulated from each other in which the outer peripheral surface of each of said segments is formed intermediate its sides with a channel that inclines to the radial axis thereof to define a tapered lip and a solid shoulder thereunder, said lip being depressible towards said shoulder to engage with a wire located in said channel.

3. An armature having an annular commutator formed from a plurality of radially extending segments insulated from each other in which the outer peripheral surface of each of said segments is formed inwardly from each of its side edges with two spaced apart channels that each incline to the radial axis thereof to define a tapered lip and a solid shoulder thereunder, said lips being depressible towards said shoulder to engage with a wire located in said channel.

4. A method for securing the free ends of armature wires in commutator segments which comprises the steps of forming each commutator segment inwardly from its sides with a channel that inclines to the radial axis thereof to define a lip and an underlying solid shoulder, placing the free end of an armature lead in said channel and depressing said lip towards said solid shoulder to lock said lead between said lip and said shoulder.

RIFAT AVIGDOR.

REFERENCES CITED

The following references are of record in the file of this patent:

UNITED STATES PATENTS

| Number | Name | Date |
|---|---|---|
| 608,299 | Potter | Aug. 2, 1898 |
| 911,713 | Frankenfield | Feb. 19, 1909 |
| 1,028,965 | Ralston | June 11, 1912 |
| 1,045,147 | Huyck | Nov. 26, 1912 |
| 1,271,984 | Zabriskie | July 9, 1918 |
| 1,297,903 | Phillips | Mar. 18, 1919 |
| 1,406,448 | Doman | Feb. 14, 1922 |
| 1,900,206 | Silberstein | Mar. 7, 1933 |
| 2,033,633 | Hawksley | Mar. 10, 1936 |
| 2,043,474 | Eynon | June 9, 1936 |
| 2,188,423 | Andrews | Jan. 30, 1940 |
| 2,188,906 | Lackey | Feb. 6, 1940 |
| 2,446,708 | Levin | Aug. 10, 1948 |

FOREIGN PATENTS

| Number | Country | Date |
|---|---|---|
| 254,675 | Great Britain | Nov. 25, 1926 |